United States Patent [19]
Nakamori et al.

[11] Patent Number: 5,334,817
[45] Date of Patent: Aug. 2, 1994

[54] SURFACE TEMPERATURE CONTROL DEVICE FOR MAINTAINING A CONSTANT TEMPERATURE BY CONTROL OF CURRENT SUPPLY

[75] Inventors: Tomohiro Nakamori, Machida; Kazuhiko Okazawa, Kawasaki; Tatsuto Tachibana, Yokohama; Akihisa Kusano, Kawasaki; Kaoru Sato, Yokohama; Toshiyuki Itoh, Sagamihara, all of Japan

[73] Assignee: Canon Kabushiki Kaisha, Tokyo, Japan

[21] Appl. No.: 727,122

[22] Filed: Jul. 9, 1991

[30] Foreign Application Priority Data

Jul. 10, 1990 [JP] Japan .................................. 2-180597

[51] Int. Cl.⁵ .............................................. H05B 1/02
[52] U.S. Cl. .................................... 219/492; 219/497; 219/505; 219/216; 219/508
[58] Field of Search ............... 219/494, 497, 499, 501, 219/505, 508, 492, 516, 483–486

[56] References Cited
U.S. PATENT DOCUMENTS

| | | | |
|---|---|---|---|
| 4,777,350 | 10/1988 | Crockett et al. | 219/497 |
| 4,948,950 | 8/1990 | Rae | 219/497 |
| 5,155,337 | 10/1992 | Sorrell et al. | 219/411 |
| 5,179,263 | 1/1993 | Koh et al. | 219/216 |
| 5,196,885 | 3/1993 | Takeuchi et al. | 355/219 |

*Primary Examiner*—Mark H. Paschall
*Attorney, Agent, or Firm*—Fitzpatrick, Cella, Harper & Scinto

[57] ABSTRACT

A temperature control device for controlling a surface temperature of a member to be heated at a predetermined temperature includes a detector for detecting the surface temperature, and a control unit for controlling current supply for a heating source for heating the member to be heated so that a result of detection by the detector is maintained at a predetermined value. The control unit controls a time of current supply for the heating source during a constant temperature control according to data relating to peak temperatures of the surface temperature during the constant temperature control.

8 Claims, 10 Drawing Sheets

SURFACE TEMPERATURE CONTROL DEVICE FOR MAINTAINING A CONSTANT TEMPERATURE BY CONTROL OF CURRENT SUPPLY

BACKGROUND OF THE INVENTION

1. Field of the Invention

This invention relates to a temperature control device for controlling the surface temperature of a member heated by a heating source.

2. Description of the Related Art

As shown in FIG. 11, a conventional fixing roller 16 of a thermal fixing device in an electrophotographic apparatus incorporates a heater 12, serving as a heating member. A thermistor 1, serving as a temperature detection means, is disposed in contact with the surface of the fixing roller 16. The heater 12 and the thermistor 1 are connected to a temperature control device (not shown), comprising a CPU and the like, so as to maintain the temperature of the surface of the fixing roller 16 at a predetermined temperature. An explanation will now be provided of a constant temperature control method with reference to FIGS. 11 and 12.

The temperature of the fixing roller 16 is detected by the thermistor 1. If the detected temperature is lower than a preset temperature (hereinafter after termed a threshold temperature), a heater drive circuit starts to heat the fixing roller 16 by supplying the heater 12 with current (step 301 in FIG. 12). When the temperature of the fixing roller 16 reaches at least the threshold temperature (represented by Ts in FIG. 12), current supply for the heater 12 is stopped (from step 302 to step 303 in FIG. 12). As shown in FIG. 13, the temperature of the fixing roller 16 first rises to a peak temperature above the threshold temperature, and then, after the heater steps, starts to descend and drops below the threshold. When the temperature of fixing roller 16 becomes lower than the threshold, the process returns to step 301, where the roller 16 starts to be heated. By repeating such a control, the surface temperature of the fixing roller 16 is maintained within a predetermined variance from the threshold.

In the above-described conventional control, however, due to a time lag produced between the actual temperature of the fixing roller and the detected temperature, and due to a time lag in heat transfer to the surface of the fixing roller, the surface temperature of the fixing roller continues to rise to a considerably high temperature even after stopping current supply for the heater, producing a large temperature ripple, as shown in FIG. 13.

SUMMARY OF THE INVENTION

It is an object of the present invention to minimize the variance of the surface temperature of a member to be heated from a selected threshold temperature.

It is another object of the present invention to control the time of current supply for a heating source during a constant temperature control according to data relating to peak temperatures of the surface temperature of a member to be heated during the constant temperature control It is still another object of the present invention to provide a temperature control wherein the surface temperature of a member to be heated when a heating source is turned off is lower than the surface temperature of the member when the heating source is turned on.

In one aspect of the invention, there is provided a temperature control device for controlling a surface temperature of a member to be heated at a predetermined temperature, the device comprising a detection means for detecting the surface temperature and control means for controlling timing of a current supply for a heating source in accordance with a result of that detection to maintain the surface temperature of the member at a predetermined value, the control means controlling a time of current supply for athe heating source during a constant temperature control in accordance with data on peak temperature values of the detected surface temperature.

In another aspect of the invention, there is provided a temperature control device for controlling a surface temperature of a member to be heated at a predetermined temperature the device comprising a detection means for detecting the surface temperature and control means for turning on and off a current supply for a heating source to maintain a result of detection by the detection means at a predetermined value , wherein the surface temperature when the heating source is turned off is lower than the surface temperature when the heating source is turned on.

These and other objects and features of the present invention will become more apparent from the following detailed description of the preferred embodiments.

DETAILED DESCRIPTION OF THE PREFERRED EMBODIMENTS

A first embodiment of the present invention will now be explained with reference to FIGS. 1 through 6. The present invention is particularly effective when the difference between the maximum value of the surface temperature of a fixing roller in a temporal change of the surface temperature of the roller and the temperature (a threshold temperature) for a constant temperature control is larger than the difference between the minimum value of the surface temperature of the roller and the threshold temperature.

Figure 1:
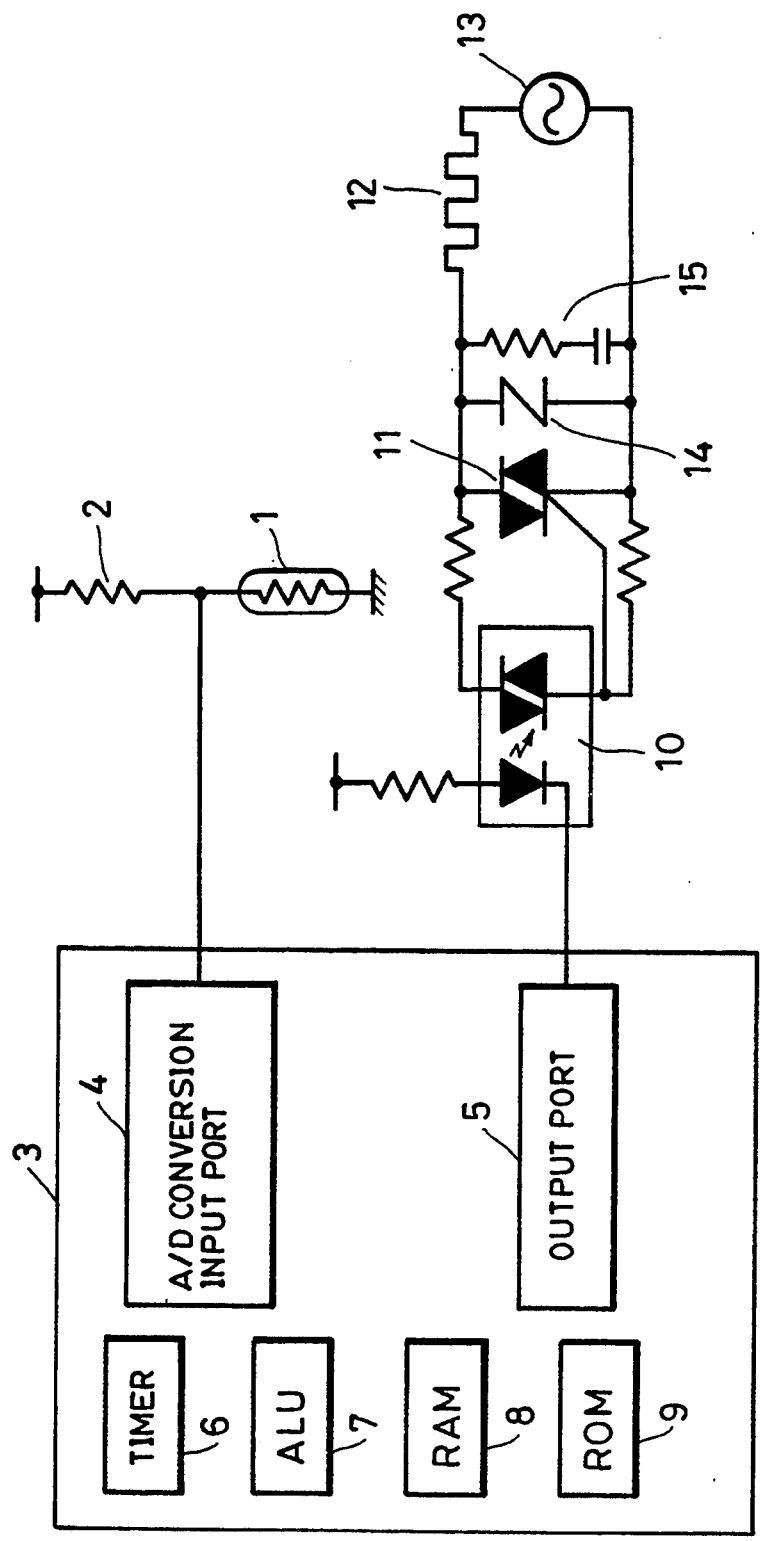
FIG. 1 is a block diagram showing the schematic configuration of a temperature control device according to a first embodiment of the present invention.

FIG. 1 shows a temperature control device of the first embodiment. In FIG. 1, a thermistor 1 serves as a temperature detection means for detecting a temperature change in a heating fixing roller 16 of an image forming apparatus (not shown), such as an electrophotographic apparatus or the like, as a change in the value of the thermistor's resistance. By connecting the thermistor 1 to a resistor 2, the change in the resistance value of the thermistor 1 is converted into a change in the value of voltage. The thermistor 1 is provided in contact with the surface of the fixing roller 16 opposite to the surface of the fixing roller 16 at the side where the heater 12 is provided. A CPU (central processing unit) 3, serving as a control means, controls the time of current supply for the heating source during a constant temperature control according to data relating to peak temperatures of the roller surface temperature during the constant temperature control. It is thereby possible to make the temperature ripple small, and to stabilize the surface temperature of a member to be heated. The CPU 3 incorporates analog-to-digital (hereinafter termed A/D) conversion input port 4, an output port 5, a timer 6, serving as a time measuring means, an arithmetic and logic unit (hereinafter termed an ALU) 7, a RAM 8 and a ROM 9, serving as storage means, and the like. The CPU 3 converts an analog signal from the thermistor 1 input to the A/D conversion input port 4 into a digital value according to a program stored in the ROM 9, and obtains the corrected time of current supply by calculating the time of current supply during the constant temperature control for the heater from the detected temperature, the time of current supply for the heater measured by the timer 6, and the rise time of the detected temperature of the heater (to be described later). The CPU 3 then outputs a heater control signal from the output port 5 in accordance with the corrected time of current supply. The output port 5 performs intermittent control of the heater by switching a thyristor 11 connected to the heater 12 and a power supply 13 via an IC photoTriac 10. A varistor 14, and a series circuit of a resistor and a capacitor connected in parallel with the thyristor 11 protect the thyristor 11.

An explanation will now be provided of a temperature control method by the device of the present embodiment. The present invention performs a constant temperature control of the surface of the fixing roller after raising the temperature of the surface of the fixing roller 16 to a fixable temperature.

The method of the present embodiment resides in that current supply for the heater is started when the surface temperature of the fixing roller becomes lower than a predetermined value (hereinafter termed a threshold temperature) which equals a fixing temperature, that is, a temperature where toner is fused during fixing. The electric current is supplied for a time calculated using predetermined expressions for calculation according to information relating to the time of previous current supply and the rise time of the detected temperature of the heater, thereby suppressing the temperature ripple to maintain it at a small value. The predetermined expressions for calculation are stored in the ROM 9 as a program, and the above-described time of current supply is calculated by the ALU 7.

The above-described expressions for calculation will now be explained.

In FIGS. 2(A) through 2(E), a temperature change in one cycle is dealt with as a model and analyzed when an intermittent control of the heater is performed making the threshold temperature a border. FIG. 2(A) shows the timing of turning on and off the heater, and indicates that current is supplied for the heater at $t=0$ and that the current supply for the heater is stopped at $t=t_1$, the point where the surface temperature of the roller becomes higher than the threshold temperature.

FIG. 2(B) represents heat quantity radiated from the roller surface. It is assumed that a constant value C (J) is always radiated irrespective of the surface temperature and the temperature around the heater. FIG. 2(C) represents heat quantity provided from the heater 12 within the fixing roller 16 for the surface of the roller. It is assumed that a time $t_2$ (including a delay produced by the thermistor) is needed from the start of current supply for the heater at $t=0$ until the heat from the heater reaches the surface of the roller. It is also assumed that the heat quantity continues to increase from time $t_2$ for the entire period of a time $t_1$ of current supply for the heater. The heat quantity of the roller surface then decreases during the same period after the heater has been turned off. The heat quantity increase and decrease is in the form of linear functions having slopes $\alpha$ and $-\alpha$, respectively.

FIG. 2(D) represents the sum of the heat quantity input to and output from the surface of the roller. The temporal change $dT/dt$ of the detected temperature of the roller surface is proportional to the above-described sum (FIG. 2(D)), and is therefore represented by the following expression:

$$dT/dt = k(Q_{IN} - Q_{OUT}) \qquad (1\text{-}1),$$

where k is a proportional constant, By integrating the expression (1-1) with respect to time with the condition of the threshold temperature at $t=0$, the detected temperature T is expressed by $$T = \text{(threshold)} + k \int_0^t Q_{IN} dt - kCt. \quad (1\text{-}2)$$

Figure 2:
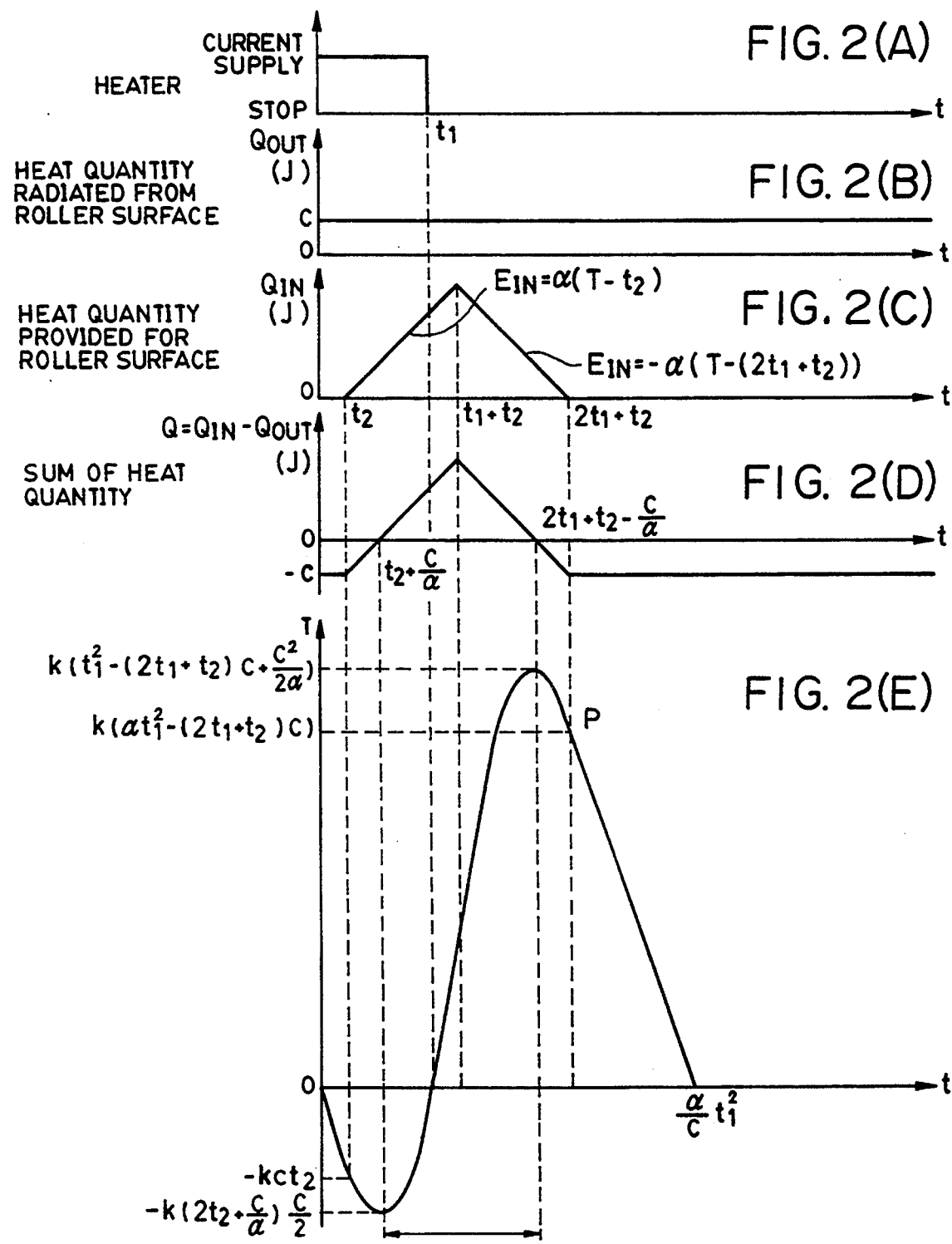
FIG. 2(A) a diagram showing the time of current supply for a heater.
FIG. 2(B) is a diagram showing heat quantity radiated from the surface of a fixing roller.
FIG. 2(C) is a diagram showing a temporal change of heat quantity provided for the surface of the fixing roller.
FIG. 2(D) is a diagram showing a temporal change of the sum of heat quantity of the surface of the fixing roller.
FIG. 2(E) is a diagram showing a temporal change of the surface temperature of the fixing roller.

FIG. 2 (E) represents the temporal change of the detected temperature T.

In order to maximize suppression of a temperature ripple of the detected temperature shown in FIG. 2(E), and maintain stable temperature control, the temperature (represented by point P in FIG. 2(E)) at the time $(2t_1+t_2)$ where the heat quantity provided for the surface of the roller is zero, as shown in FIG. 2(C), must equal the threshold temperature. Accordingly, the detected temperature $T_P$ at the point P is expressed from expression (1-2) by $$T_P = \text{(threshold temperature)} + k\{at_1^2 - (2t_1+t_2)C\} \quad (1\text{-}3).$$

Hence, $$at_1^2 - (2t_1+t_2)C \quad (1\text{-}4).$$

Hence, $$t_1 = C/a + \{(C/a)^2 + (C/a)t_2\}^{\frac{1}{2}} \quad (1\text{-}5).$$

Now, $t_2$ is replaced by $$t_2 = \beta(C/a) \quad (1\text{-}6),$$

where $\beta$ is a constant determined by the configuration of the device, such as the heating characteristic of the heater, the material of the roller and the like. The term $C/a$ can be expressed by $$C/a = \{2t_1 - 2)t_1 - C/a)\}/2 \quad (1\text{-}7).$$

In expression (1-7), the term $2(t_1 - C/a)$ represents the rise time which equals the time for heating from the minimum temperature to the maximum temperature, i.e., peak temperatures of the roller surface, and $t_1$ represents the time of current supply for the heater. Hence, the heater correction time $t_{ON}$ which equals the time of current supply for the heater at the next cycle is expressed from expressions (1-5) and (1-7) by $$t_{ON} = ((2t_A - t_B)/2) \times (1 + (1+\beta)^{\frac{1}{2}}) \quad (1\text{-}8),$$

where $t_A$ is the time of current supply for the heater at the preceding cycle, and $t_B$ is the rise time at the preceding cycle.

Figure 3:
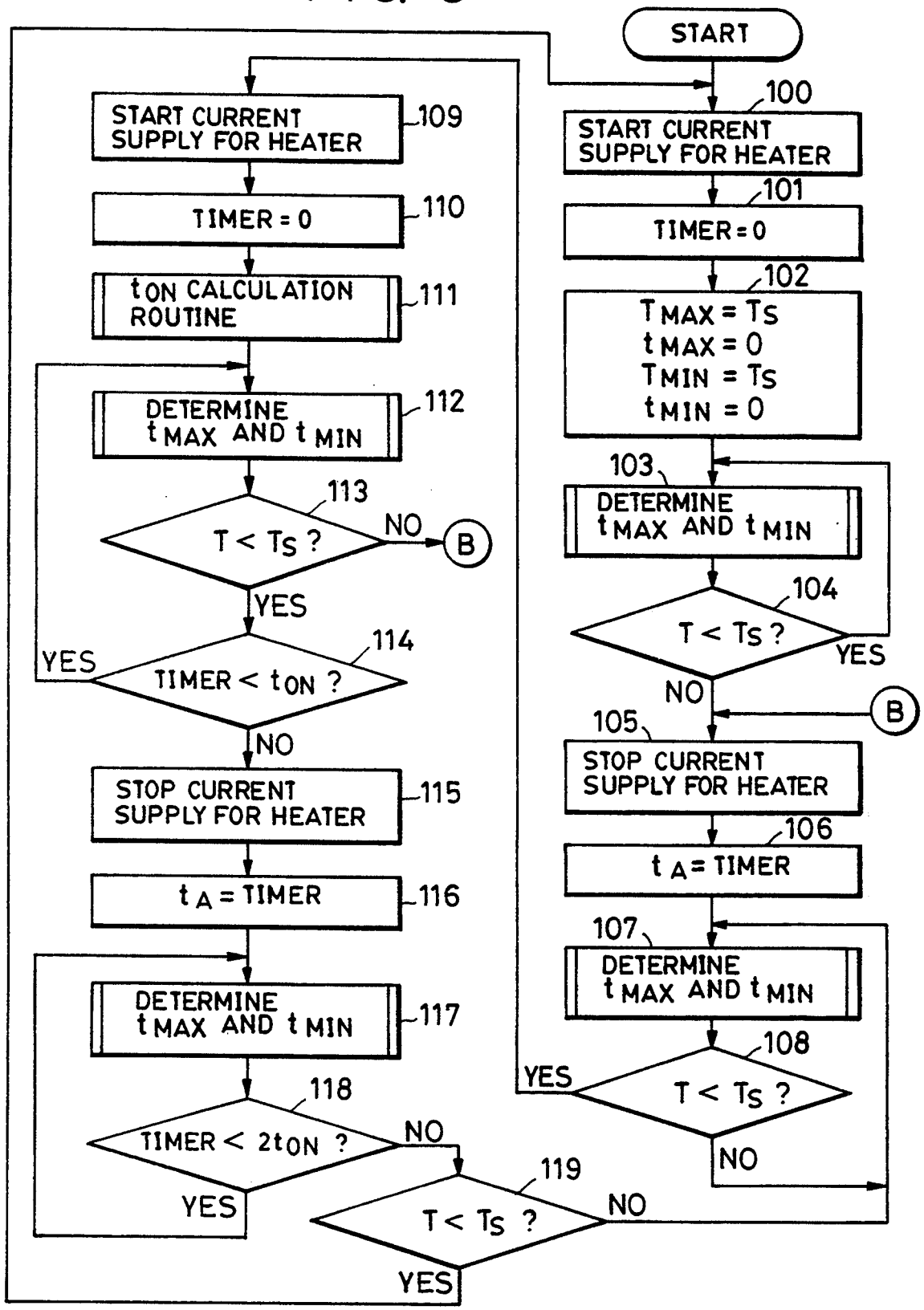
FIG. 3 is a flowchart showing a control of the present invention.
Figure 4A:
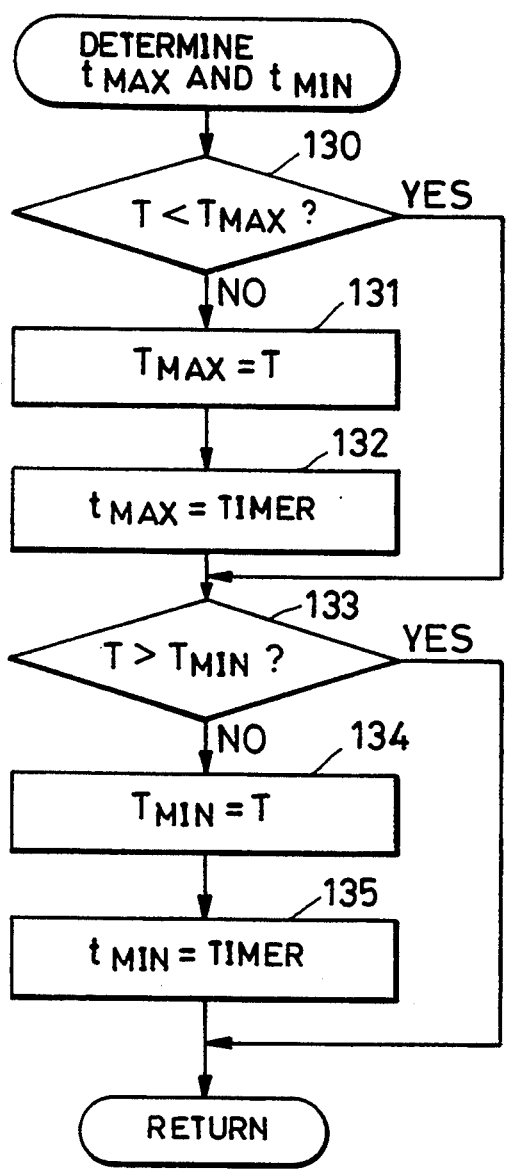
FIG. 4(A) is a flowchart showing a method of determining values $t_{max}$ and $t_{min}$.
Figure 4B:
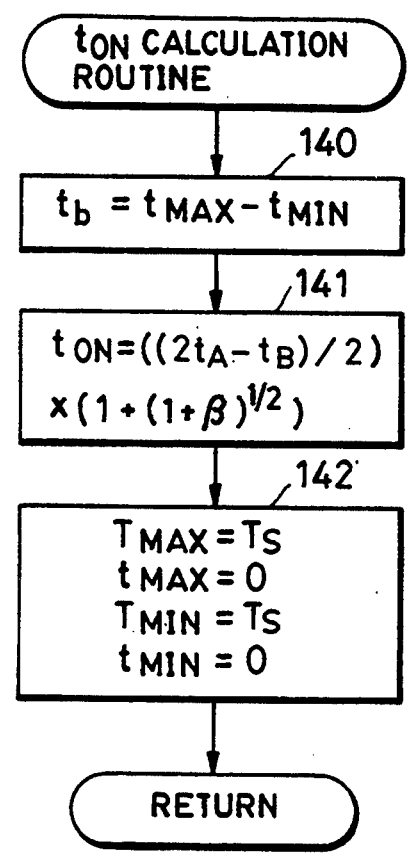
FIG. 4(B) is a flowchart showing a method of calculating a value $t_{on}$.
Figure 5:
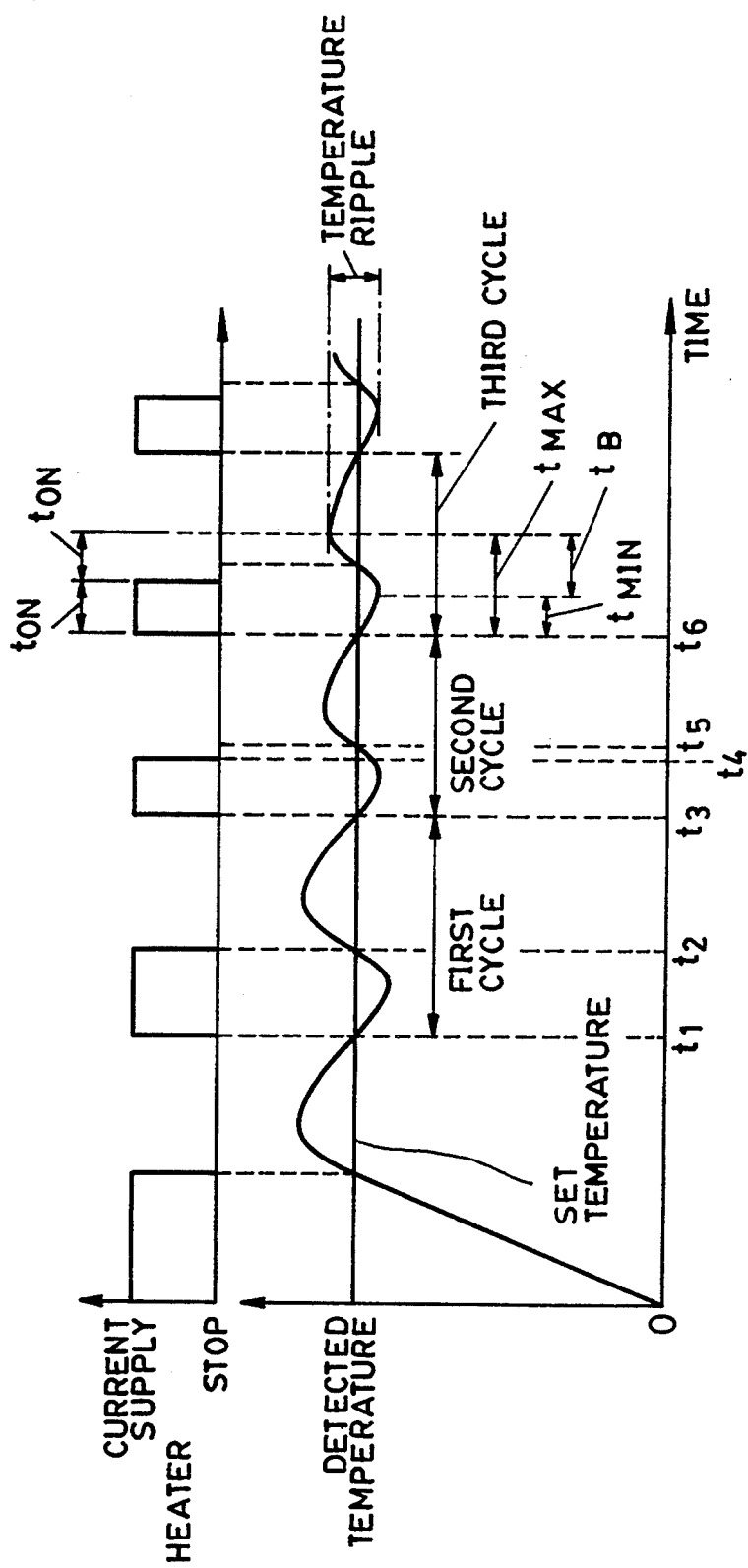
FIG. 5 is a diagram showing the surface temperature of the fixing roller and the current supply state for the heater.
Figure 6:
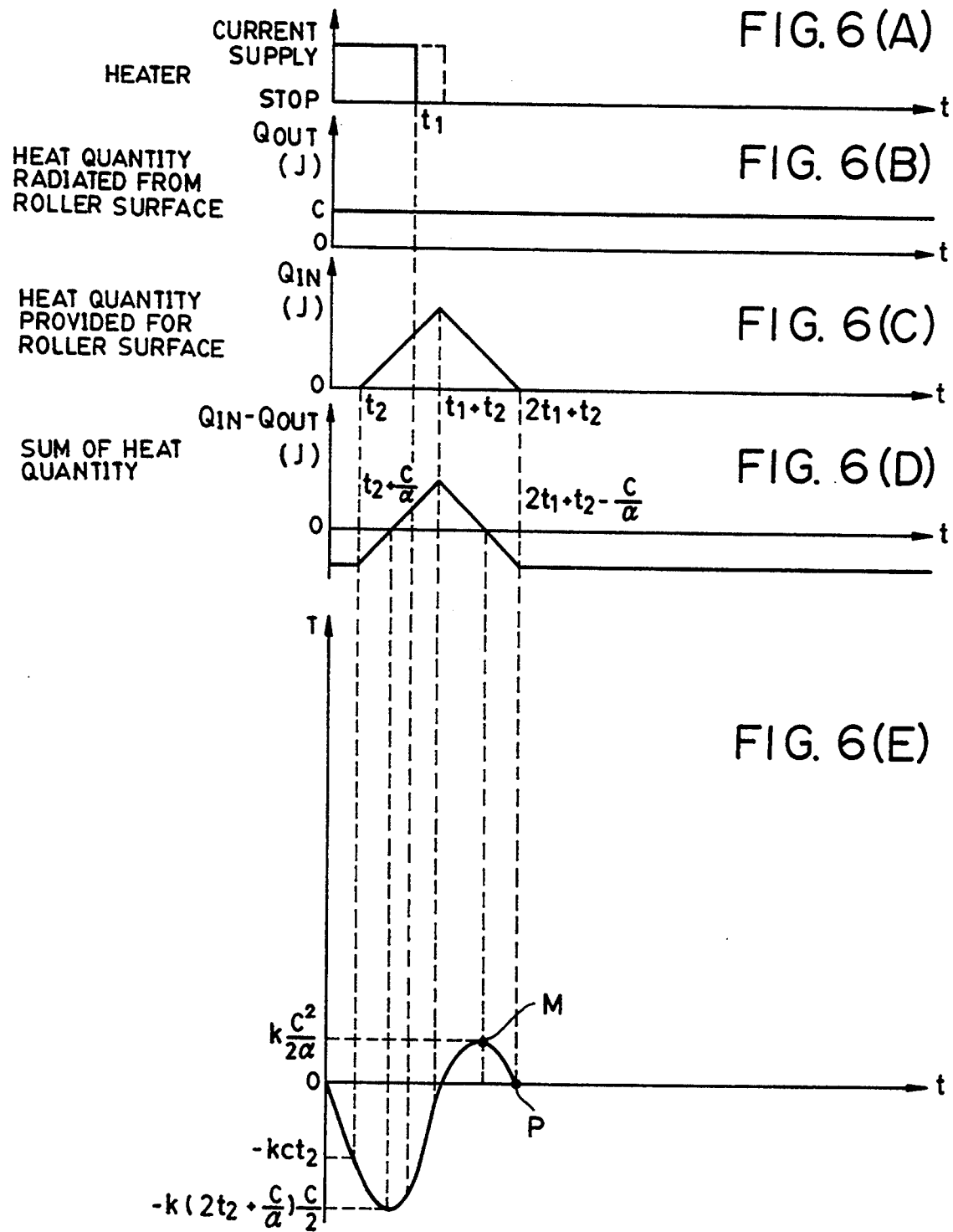
FIG. 6(A) is a diagram showing the time of current supply for the heater.
FIG. 6(B) is a diagram showing heat quantity radiated from the surface of the fixing roller.
FIG. 6(C) is a diagram showing a temporal change of heat quantity provided for the surface of the fixing roller.
FIG. 6(D) is a diagram showing a temporal change of the sum of the heat quantity of the surface of the fixing roller.
FIG. 6(E) is a diagram showing a temporal change of the surface temperature of the fixing roller when current is supplied in accordance with the corrected time of current supply for the heater.

An explanation will now be provided of a temperature control method using the above-described expression (1-8) with reference to FIGS. 3-5.

The control in this method is started after warm-up is completed by stopping current supply for the heater when the detected temperature has reached at least the threshold temperature, and the temperature descends to the threshold temperature. The control in a first cycle is performed in order to obtain the time $t_A$ of current supply in the preceding cycle and the temperature rise time $t_B$, necessary for calculating the time $t_{ON}$ of current supply for a second cycle which follows. In the first cycle, a constant temperature control is performed wherein the heater is turned off when the surface temperature of the roller rises up to a predetermined value, and the heater is turned off when the temperature descends to the predetermined value. After the start of current supply for the heater (time $t_1$ in FIG. 5) (step 100 in FIG. 3), the timer is reset to 0 (step 101). Subsequently, respective values for $T_{max}$, $t_{max}$, $T_{min}$ and $t_{min}$ are initialized (step 102, wherein $T_S$ represents the threshold temperature).

Also with the start of current supply for the heater, the maximum value and the minimum value of the surface temperature of the roller are detected, and the values $t_{max}$ and $t_{min}$ are thereby determined (step 103). First, at step 103, the time $t_{min}$ from the time to start current supply for the heating source to the time of arrival at the minimum value of the surface temperature of the roller before the time $t_2$ shown in FIG. 5 is determined. FIG. 4(A) shows a flowchart for determining the values $t_{max}$ and $t_{min}$. When the detected temperature T is input, the temperature T is compared with the past maximum value $T_{max}$ (At the first cycle, the first input value T becomes the value $T_{max}$. Alternatively, a value $T_{max}$ may be set in advance.) (step 130). If the value T is greater than the value $T_{max}$, the value T newly becomes the value $T_{max}$ (step 131), which becomes a value to be compared with a new value T to be subsequently input. If a value T greater than the value $T_{max}$ is no longer input, the time $t_{max}$ is set based on the time when current supply for the heating source is started to the time when the maximum value of the surface temperature of the roller is obtained (step 132). If the detected temperature T is determined to be smaller than the value $T_{max}$ at step 130, the process proceeds to slap 133, where the value T is compared with the past minimum value $T_{min}$. (At the first cycle, the first input T becomes the value $T_{min}$. Alternatively, a value $T_{min}$ may be set in advance.). Subsequently, in tile same manner as when obtaining the value $t_{max}$, if the value T is smaller than the value $T_{min}$, the value T newly becomes the value $T_{min}$ (step 134), which becomes a value to be compared with a new value T to be subsequently input. If a value T smaller than the value $T_{min}$ is no longer input, the time $t_{min}$ corresponding to the value $T_{min}$ is determined.

In practice, between the time $t_1$ and the time $t_2$, that is, at step 103, only the value $t_{min}$ is determined, and between the time $t_2$ and the time $t_3$ (to be described later), that is, at step 107, only the value $t_{max}$ is determined.

Referring again to FIG. 3, at step 104, it is determined whether or not the detected temperature T is smaller than the threshold $T_S$. If the result of the determination is affirmative, the detection operation of the value $t_{min}$ is continued. If the result of the determination is negative, current supply for the heater is stopped (step 105), and the time $t_A$ of current supply for the heater obtained from the difference between the time $t_2$ and the time $t_1$ at that time is stored in RAM 8 (step 106).

The time $t_{max}$ is determined before time $T_3$, that is, before the temperature of the roller surface drops again to the threshold $T_S$ (step 107). The time $t_{max}$ is the time from when current supply for the heater source is started to the time when the temperature of the roller surface reaches the maximum value. At step 108, it is determined whether the detected temperature T is smaller than the threshold $T_S$. If the result of that determination is negative, the operation of detecting the value $t_{max}$ is continued. If the result of that determination is affirmative, current supply for the heater is started (step 109). The second cycle is started from the step 109.

In the second cycle, current supply for the heater is started (step 109), the timer is reset (step 110), and the time $t_{ON}$ of current supply for the heater is then calculated (step 111).

FIG. 4(B) is a flowchart for obtaining the value $t_{ON}$. First, the temperature rise time $t_B$ is calculated from the difference between the time $t_{max}$ of arrival at the maximum temperature and the time $t_{min}$ of arrival at the minimum temperature in the preceding cycle (step 140). The value $t_{ON}$ is then obtained from the value $t_B$ and the time $t_A$ of current supply for the heater in the preceding cycle using the expression (1-8)

$$t_{ON} = \{(2t_A - t_B)/2\} \times \{1 + (1+\beta)^{\frac{1}{2}}\} \qquad \text{(step 141).}$$

When the value $t_{ON}$ has been obtained, the values $T_{max}$, $T_{min}$, $t_{max}$ and $t_{min}$ are initialized (step 142).

Referring again to FIG. 3, the value $t_{min}$ is determined between time $t_3$ and time $t_4$ in the same manner as in step 103 (step 112). At step 113, it is determined whether the detected temperature is smaller than the threshold $T_S$. If the result of the determination is negative ( ), current supply for the heater is stopped (step 105).

If the result of the determination at step 113 is affirmative, the corrected time $t_{ON}$ of current supply is compared with the time from the start of the second cycle to the present time (step 114). If the time from the start of the second cycle to the present is less than the value $t_{ON}$, current supply for the heater is forcibly stopped (step 115). At that time, the surface temperature of the fixing roller is lower than the surface temperature when the heating source is turned on. It is thereby possible to reduce the difference between the maximum value and the minimum value of the surface temperature, and therefore to stabilize the surface temperature. Furthermore, by turning off the heating source when the detected temperature is lower than the threshold $T_S$, a ripple portion higher than tile value $T_S$ produced when starting to heat the heater can be reduced, and the surface temperature of the roller can be thereby stabilized. At step 116, the time $t_A$ of current supply for the heater is stored.

Subsequently, the value $t_{max}$ is determined for the time between time $t_4$ and time $t_6$ in the same manner as in step 107 (step 117). At step 118, a temperature change is monitored while performing a loop until the time from the start of current supply for the heater becomes twice the time of current supply for the heater, that is, until the same time as the time of current supply for the heater lapses after current supply for the heater has been stopped (step 119). If the detected temperature T at that time exceeds the threshold temperature $T_S$, a third cycle (the same control as in the second cycle) is performed making the second cycle tile preceding cycle. If the detected temperature is lower than the threshold, the same control as in the first cycle is repeated.

That is, if the temperature of the roller surface abrubtly descends against estimation due to an abrupt change in environment or the like, the process is returned to the same control as in the first cycle to heat the roller surface for the purpose of correcting the temperature of the roller surface.

FIG. 5 shows a temperature change when the present control is performed. FIGS. 6(A)–6(E) show the result of analysis of the temperature change in the second cycle. The constant $\beta$ in the expression (1-8) is preferably set at $\beta = 2$ to suppress temperature ripple and stabilize temperature control.

Alternatively, the time of current supply for the heating source may be controlled so that the absolute value of the difference between the maxim value $T_{max}$ of the temperature of the roller surface and the threshold $T_S$ equals the absolute value of the difference between the minimum value $T_{min}$ and the threshold $T_S$. It is thereby possible to reduce the difference between the maximum value and the minimum value, and obtain a stable surface temperature.

Figure 7:
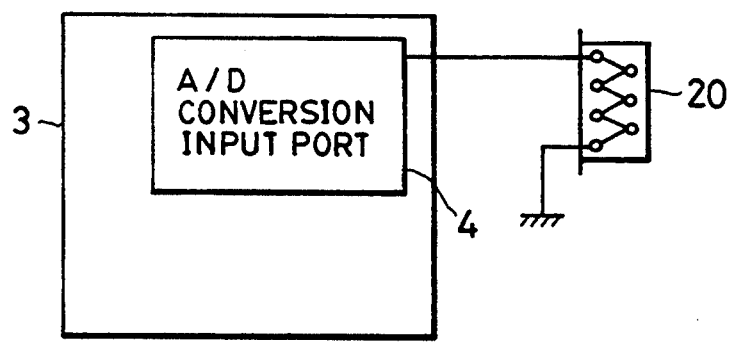
FIG. 7 is a diagram showing the schematic configuration of a temperature detection means according to a second embodiment of the present invention.
Figure 8:
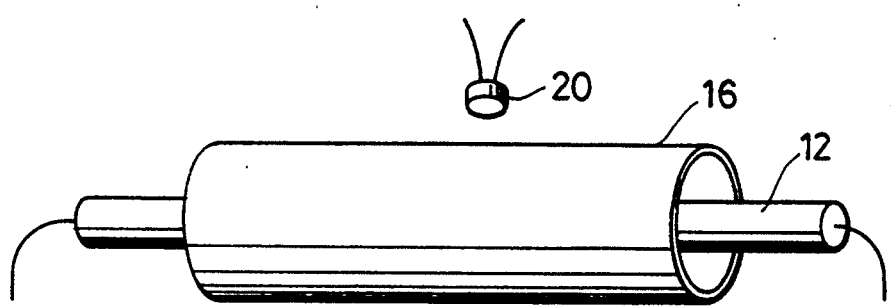
FIG. 8 is a diagram showing how the temperature detection means of the second embodiment is disposed.

A second embodiment of the present invention will now be explained with reference to FIGS. 7 and 8. In FIGS. 7 and 8, like components as those in the first embodiment are indicated by like numerals, and an explanation thereof will be omitted.

The present embodiment differs from the first embodiment in that, as shown in FIGS. 7 and 8, a so-called thermopile 20 which detects temperature using infrared radiation from the fixing roller is used as a means for detecting the temperature of the fixing roller. In this case, the temperature control is the same as in the first embodiment. The temperature detector of this type has the advantages that, since the temperature is detected without contacting the fixing roller, there is no possibility of damaging the fixing roller, and a time lag between the detected temperature and the actual temperature of the fixing roller is small.

Figure 9:
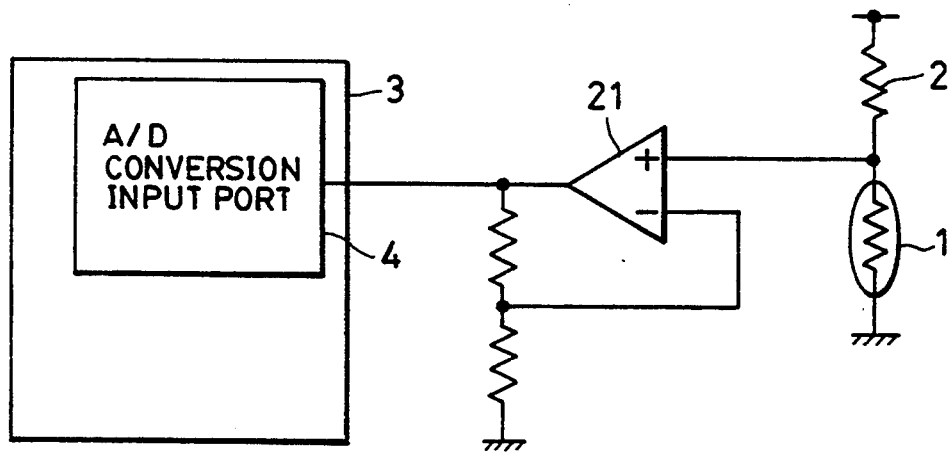
FIG. 9 is a diagram showing the schematic configuration of a temperature detection means according to a third embodiment of the present invention.

Next, a third embodiment of the present invention will be explained with reference to FIG. 9. In FIG. 9, like components as those in the first embodiment are indicated by like numerals, and an explanation thereof will be omitted.

The present embodiment differs from the first embodiment in that, as for a means for detecting the temperature of the fixing roller, a voltage near the set temperature is amplified by providing an amplifying circuit 21 between the A/D conversion input port of the CPU and the thermistor, as shown in FIG. 9. The temperature control in this case is also the same as in the first embodiment. By providing the above-described circuit, it becomes possible to detect temperatures more correctly near the threshold, to provide an exact timing for the time to start or stop current supply for the heater, and to set the threshold temperature.

Next, a fourth embodiment of the present invention will be explained with reference to FIG. 10.

In the present embodiment, in order to also suppress a temperature ripple portion in the first cycle, a time $t_{START}$ of initial current supply for the heater calculated in advance from the expression (1-8) is set, and the control to supply current for the heater is performed only during this time period in the first cycle. Accordingly, it becomes possible to perform a control to suppress a temperature ripple from the first cycle.

Figure 10:
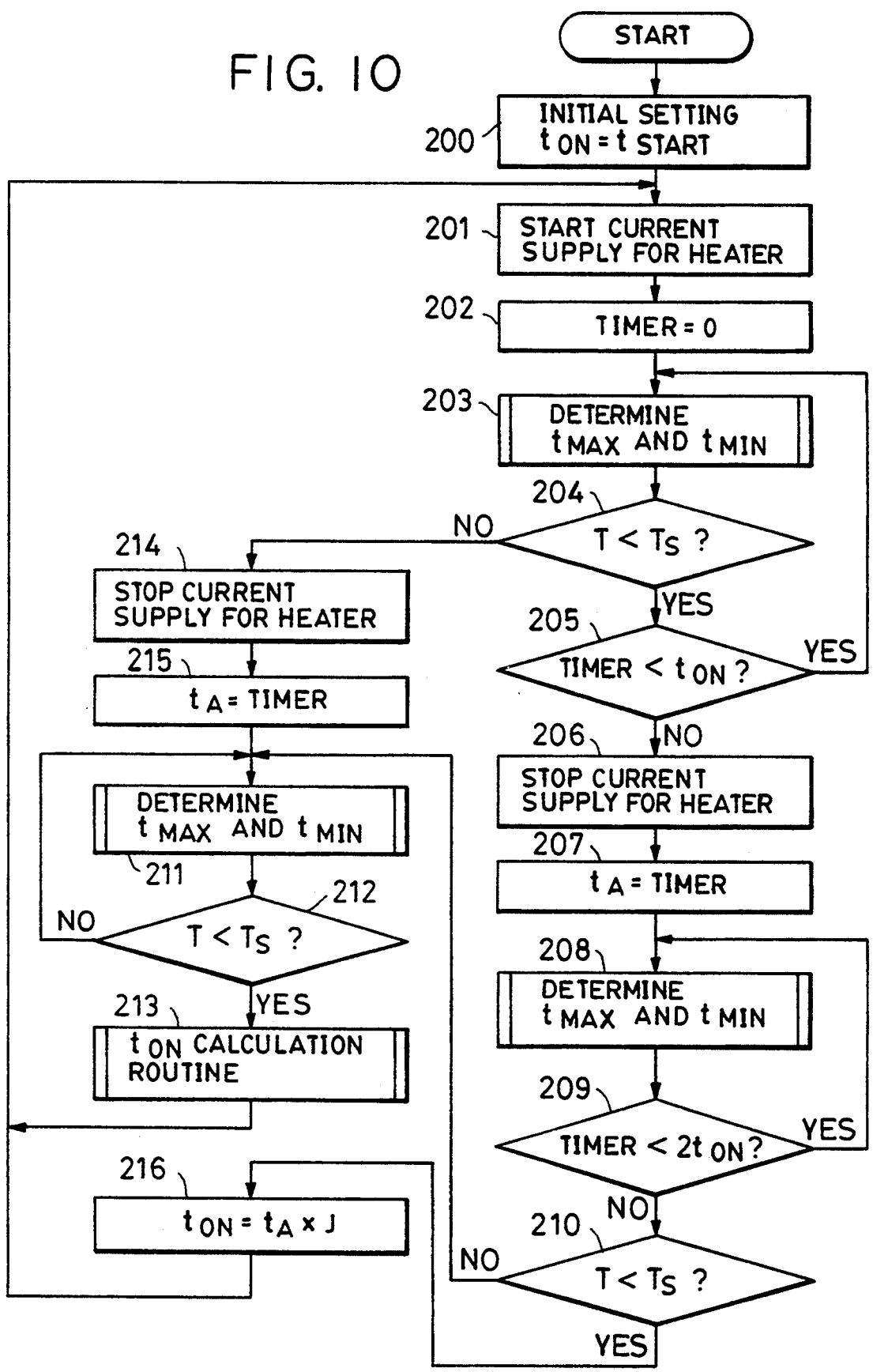
FIG. 10 is a flowchart showing a temperature control according to a fourth embodiment of the present invention.
Figure 11:
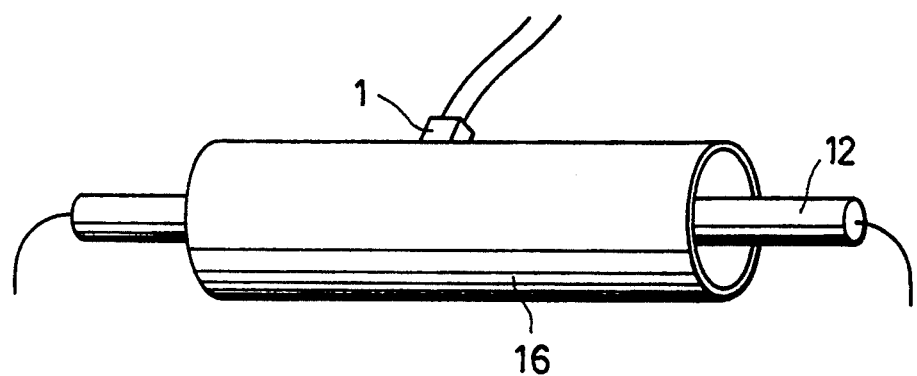
FIG. 11 is a diagram showing the schematic configuration of a conventional fixing device.
Figure 12:
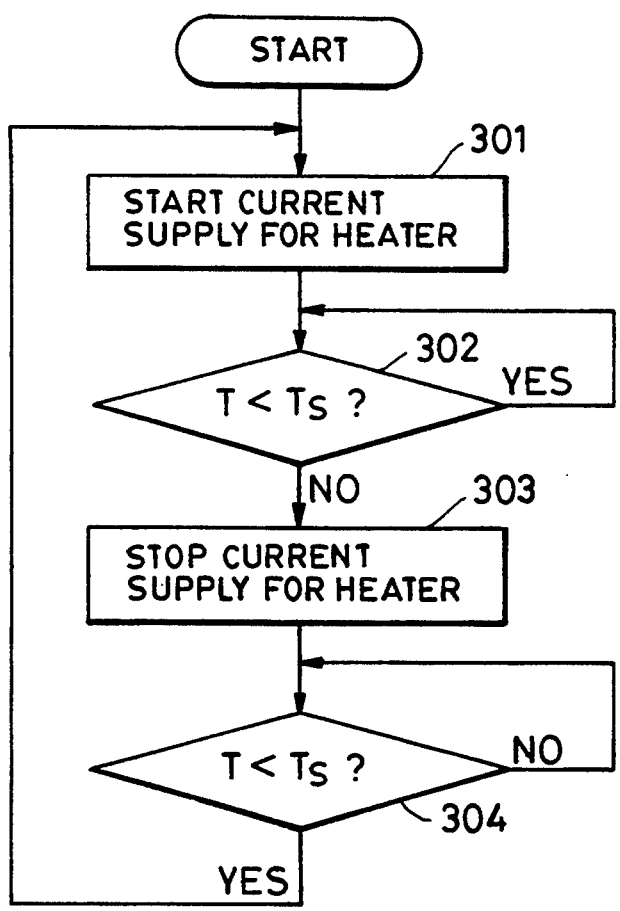
FIG. 12 is a flowchart showing a conventional temperature control.
Figure 13:
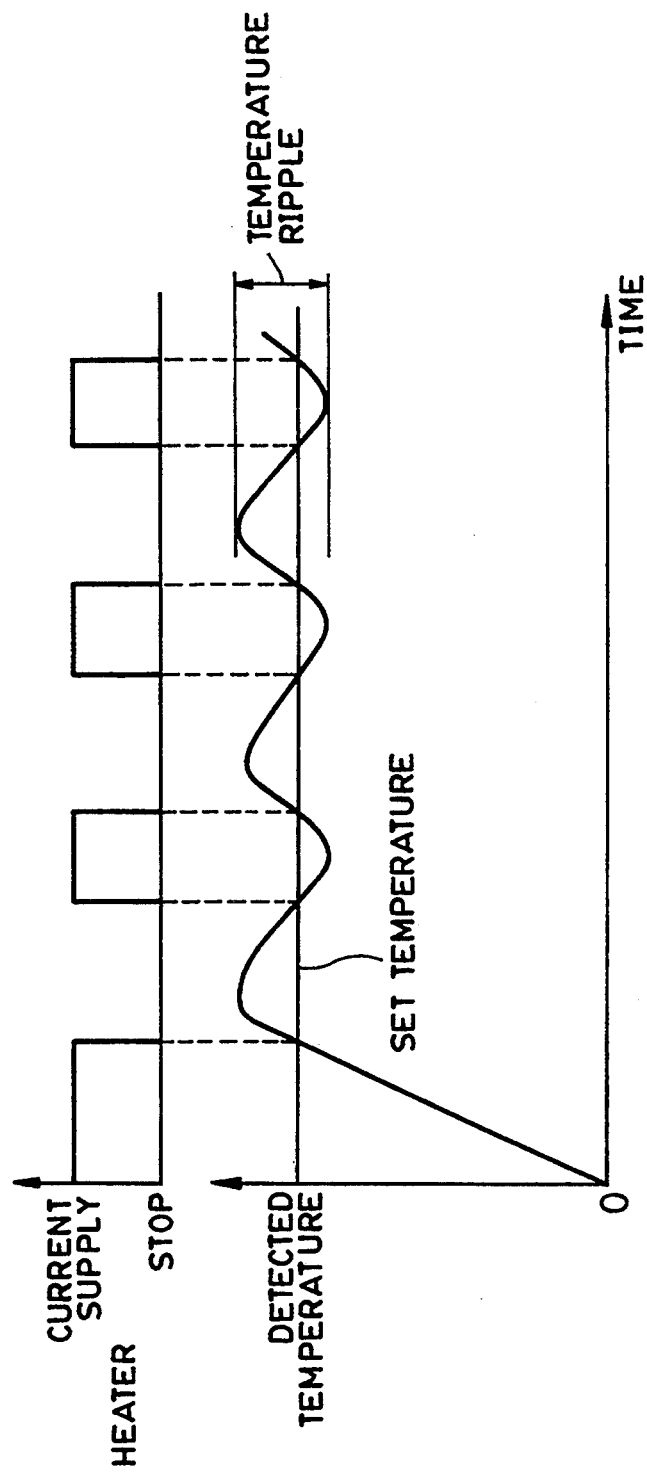
FIG. 13 is a diagram showing a temporal change of the surface temperature of a conventional fixing roller.

FIG. 10 is a flowchart of this control. First, at the initial setting stage, the time $t_{START}$ of initial current supply for tile heater which equals the corrected time of current supply obtained in advance from the expression (1-8) is set as the time $t_{ON}$ of current supply for the heater (step 200). As in the first embodiment, the temperature control of the first cycle is started after the detected temperature is raised to the threshold, current supply for the heater is stopped, the temperature then descends below the threshold, and current supply for the heater is resumed (step 201). When the time of current supply after its start reaches the value $t_{ON}$ (the initial value for the first cycle), current supply for the heater is stopped (steps 205 and 206), and a temperature change is monitored while waiting for the same time as the value tom (step 209). After waiting, if the detected temperature exceeds the threshold (step 210), it is awaited until the detected temperature becomes lower than the threshold (step 212). Subsequently, the time $t_{ON}$ of current supply for the heater is calculated (step 213), and current is supplied for the heater (step 201). This control is repeated. When the detected temperature does not reach the threshold after waiting at step 210, that is, when the maximum temperature at that cycle is lower than the set temperature, the value obtained by multiplying the time $t_{ON}$ in the preceding cycle by J is made the time of current supply for the next cycle (step 216). When the detected temperature exceeds the threshold during the time of current supply for the heater after the start of current supply for the heater at step 210, current supply for the heater is stopped at that time (from step 204 to step 214), and the process proceeds to step 215 without waiting.

The expressions for calculating the time of current supply for the heater and respective subroutines are the same as in the first embodiment.

As for the constant J, it is preferably set at J=1.2.

A fifth embodiment of the present invention will now be explained with reference to FIGS. 6(A)-6(E). In the fifth embodiment, like items as those in the first embodiment are indicated by like numerals, and an explanation thereof will be omitted.

In the first embodiment, the time of current supply for the heater in the next cycle is calculated from the time of current supply for the heater in the preceding cycle and the rise time of the detected temperature.

In the present embodiment, in order to more exactly measure a temperature change in the preceding cycle, a fall time $t_C$ from the time of starting current supply for the heater to the time where the detected temperature rises is measured. Thus, in place of the value in the first embodiment $$t_2 = \beta(C/\alpha) \qquad (2-1),$$

it is possible to obtain the value $$t_2 = t_{DOWN} - C/\alpha \qquad (2-2),$$

where $t_C$ is the fall time of the detected temperature in the preceding cycle, since $t_C = t_2 + C/\alpha$ from FIG. 6(D). Further, it is possible to obtain $$t_{ON} = k + (k \times t_C)^{\frac{1}{2}} \qquad (2-3),$$

where $k = (t_B - 2t_A)/2$. Hence, a generalized expression not depending on the shape and material of the fixing device, power consumption of the heater and tile like can be obtained, and a generally-usable control can be performed.

Furthermore, by selecting a waiting time, which is coincident with the same time period as the time tom of current supply for the heater in the first embodiment, that is, between the time to stop current supply for the heater and point M where the detected temperature T has the maximum value in FIG. 6(E) so that the detected temperature T has the maximum value within the cycle immediately after waiting, a proper control may be performed. For example, if the waiting time is too long or too short, the detected temperature T after waiting will be lower than the threshold. Hence, the device might determine that the time of current supply for the heater is too short, and perform a wrong control of the amount of current supply for the heater. In the present embodiment, however, there is no possibility of performing such a wrong control since a proper waiting time is provided. By measuring the fall time of the detected temperature in the preceding cycle, it is possible to obtain the waiting time tw by $$tw = t_1 + t_2 - C/\alpha, \qquad (2-4)$$

further from expressions (1-5) and (2-2), $$= (C \times tc/\alpha)^{\frac{1}{2}} + tc - C/\alpha \qquad (2-5)$$
$$= (ktc)^{\frac{1}{2}} + tc - k. \qquad (2-6)$$

As explained above, according to the present invention, the time of current supply for the heater in the next cycle is obtained from predetermined expressions for calculation based on the time of current supply for the heater in the preceding cycle and the rise time of the detected temperature of the heater, and the amount of current supply for the heater is thereby properly controlled. Hence, it is possible to minimize a temperature ripple, and to detect a minute temperature change due to external factors, such as paper passing and the like, While the present invention has been described with respect to what is presently considered to be the preferred embodiments, it is to be understood that the invention is not limited to the disclosed embodiments. The present invention is intended to cover various modifications and equivalent arrangements included within the spirit and scope of the appended claims.

What is claimed is:

1. A temperature control device for maintaining a surface temperature of a member being heated by a heating source at approximately a predetermined temperature, said device comprising:

control means for controlling a start and a duration of a second current supply for said heating source, said control means calculating the duration for the second current supply in accordance with a time required for a first current supply for said heating source and a time required for a surface temperature of said member to be heated from a minimum value to a maximum value during application of the first current supply, said control means starting the second current supply after the surface temperature of said member which has been heated by the first current supply has fallen to the predetermined temperature.

2. A temperature control device according to claim 1, wherein the first current supply for said heating source is performed after the surface temperature of said member to be heated has risen to the predetermined temperature.

3. A temperature control device according to claim 1, wherein when the duration of the first current supply is $t_A$ and the required time for the surface temperature of said member to be heated to change from the minimum value to the maximum value is $t_B$, said control means calculates the time required for the second currently supply $t_{on}$ in accordance with the formula:

$$t_{on} = \{(2t_A - t_B)/2\} \times \{1 + (1+\beta)^{\frac{1}{2}}\},$$

wherein $\beta$ is a constant reflecting a heat character of the heating source and materials of the member to be heated.

4. An image forming apparatus, comprising:

image forming means for forming a toner image on a recording material;

fixing means for fixing the toner image on the recording material, said fixing means having a conveying member for conveying the recording material and a heater for heating said conveying member;

control means for controlling a start and a duration of a second current supply for said heating source, said control means calculating the duration for the second current supply in accordance with a time required for a first current supply for said heating source and a time required for a surface temperature of said member to be heated from a minimum value to a maximum value during application of the first current supply, said control means starting the second current supply after the surface temperature of said member which has been heated by the first current supply has fallen to the predetermined temperature.

5. An image forming apparatus according to claim 4, wherein the first current supply for said heater is performed after the surface temperature of said conveying member has risen to the predetermined temperature.

6. An image forming apparatus according to claim 4, wherein when the duration of the first currently supply is $t_A$ and the required time for the surface temperature of said conveying member to change from the minimum value to the maximum value is $t_B$, said control means calculates the time required for the second current supply $t_{on}$ in accordance with the formula:

$$t_{on} = \{(2t_A - t_B)/2\} \times \{1 + (1+\beta)^{\frac{1}{2}}\},$$

wherein $\beta$ is a constant reflecting a heat character of the heating source and materials of the conveying member.

7. An image forming apparatus according to claim 4, further comprising detection means for detecting the surface temperature of said conveying member, wherein said heater is arranged on a back side of a surface of said conveying member the temperature of which is being detected by said detection means.

8. An image forming apparatus according to claim 4, wherein said conveying member comprises a rotatable member.

* * * * *

UNITED STATES PATENT AND TRADEMARK OFFICE
CERTIFICATE OF CORRECTION

PATENT NO. : 5,334,817  
DATED : August 2, 1994  
INVENTOR(S) : TOMOHIRO NAKAMORI, ET AL.

It is certified that error appears in the above-indentified patent and that said Letters Patent is hereby corrected as shown below:

<u>Column 2,</u>
    line 12, "athe" should read --the--; and  
    line 19, "temperature" should read --temperature,--.  
<u>Column 4,</u>
    line 6, "protect" should read --protects--.  
<u>Column 6,</u>
    line 29, "slap" should read --step--; and  
    line 32, "tile" should read --the--.  
<u>Column 7,</u>
    line 23, "( )," should read --(②),--;  
    line 39, "tile" should read --the--.  
<u>Column 9,</u>
    line 54, "tile" should read --the--; and  
    line 58, "time tom" should read --time ton--.  
<u>Column 10,</u>
    line 60, "currently" should read --current--.  
<u>Column 12,</u>
    line 4, "currently" should read --current--.

Signed and Sealed this

Sixteenth Day of May, 1995

Attest:

BRUCE LEHMAN

Attesting Officer      *Commissioner of Patents and Trademarks*